United States Patent [19]

Fairchild

[11] Patent Number: 5,492,560
[45] Date of Patent: Feb. 20, 1996

[54] TREATMENT OF INORGANIC PIGMENTS WITH CARBOXYMETHYLCELLULOSE COMPOUNDS

[75] Inventor: George H. Fairchild, Bethlehem, Pa.

[73] Assignee: Minerals Technologies, Inc., New York, N.Y.

[21] Appl. No.: 150,507

[22] Filed: Nov. 10, 1993

[51] Int. Cl.$^6$ .............................. C09C 3/10; C09C 1/00; C09C 1/02
[52] U.S. Cl. .......................................... 106/204; 106/197.2
[58] Field of Search ................................. 106/197.2, 204

[56] References Cited

U.S. PATENT DOCUMENTS

| | | | |
|---|---|---|---|
| 2,795,509 | 6/1957 | van Zelst | 106/618 |
| 3,730,830 | 5/1973 | Driscoll | 162/146 |
| 4,210,488 | 7/1980 | Reuss et al. | 162/162 |
| 4,310,360 | 1/1982 | Kvant | 106/471 |

*Primary Examiner*—David Brunsman
*Attorney, Agent, or Firm*—Pennie & Edmonds

[57] ABSTRACT

The disclosed invention relates to a composition comprising finely divided particles of an inorganic material treated with a cellulose derivative modified by or containing at least one ionic substituent. The disclosed invention further relates to a method of providing paper of improved brightness. The disclosed invention also relates to a method of providing finely divided particles of inorganic material, treating the particles with a cellulose derivative modified by or containing at least one ionic substituent, and adding the treated particles to cellulose fiber during an alkaline process for making paper. Also, an alkaline paper comprising the finely divided particles of inorganic material treated with the cellulose derivative is disclosed.

17 Claims, 4 Drawing Sheets

TREATMENT OF INORGANIC PIGMENTS WITH CARBOXYMETHYLCELLULOSE COMPOUNDS

FIELD OF THE INVENTION

This invention relates to improved filler materials for paper, and alkaline paper including those filler materials. This invention also relates to methods of preparing paper, particularly to methods for preparing paper using the filler materials.

BACKGROUND OF THE INVENTION

Fillers of inorganic material typically are added to cellulose fibers during alkaline paper making to improve brightness, opacity, paper smoothness, and/or printability. Fillers used in alkaline paper making processes generally are inorganic materials. As much filler as possible is employed in manufacture of alkaline paper because increasing the amount of filler in alkaline paper making reduces manufacturing costs. Additionally, the filler provides improved properties to alkaline paper such as opacity and brightness.

Brightness is a function of light reflectiveness. Inorganic materials such as chalk, talc and clays provide low brightness. It is known that the brightness imparted by filler clays can be improved through calcination. However, calcined clay is undesirably abrasive.

The brightness of alkaline paper that contains inorganic fillers which have low brightness also can be improved by including fluorescent whitening agents or optical brighteners. However, these chemicals are expensive and present environmental concerns.

The art shows various filler materials and processes for paper making. U.S. Pat. No. 2,795,509 discloses stable dispersions of silicon dioxide in solutions of cellulose ethers which are useful as sizing compositions.

U.S. Pat. No. 3,730,830 discloses a method for making paper having good strength wherein a slurry of staple fiber, carboxymethylcellulose and an inorganic pigment is formed, followed by addition of cellulose fiber.

U.S. Pat. No. 4,310,360 discloses a method for producing a sizing composition comprising heating a pigment in the presence of a polysaccharide.

U.S. Pat. 4,210,488 discloses a process for improving the effect of optical brighteners by absorbing polypiperdine halide adsorbed on carboxymethylcellulose.

Carboxymethylcellulose is a wet end paper additive which improves the dry strength of paper. Solutions of carboxymethylcellulose can also be applied to the surface of paper to improve surface strength, smoothness, as well as oil or grease holdout.

None of the above patents successfully address the problem of improving the brightness of alkaline paper products which contain inorganic pigment type fillers. Accordingly, a need exists for an inorganic filler material that provides increased brightness in alkaline paper products.

SUMMARY OF THE INVENTION

The disclosed invention relates to an inorganic filler material treated with a cellulose derivative. The cellulose derivative preferably is modified by or contains at least one ionic substituent such as Sodium.

The disclosed invention further relates to a method of providing alkaline paper of improved brightness. The method entails providing finely divided inorganic filler material, treating the filler material with a cellulose derivative that has been modified by or contains at least one ionic substituent, and adding the treated filler material to cellulose fiber during an alkaline process for making paper. The invention also relates to an alkaline paper comprising the treated filler material.

Useful inorganic materials which can be treated in accordance with the invention include minerals such as titanium dioxide, alkaline earth carbonates such as natural and precipitated calcium carbonate ("PCC"), clay, talc, alumina trihydrate, sodium aluminosilicate and zinc sulfide. Preferably, the filler material is an alkaline earth metal carbonate, most preferably PCC.

The cellulose derivatives employed to treat the inorganic materials can be salts of a cellulose, i.e., a cellulose modified by or having at least one ionic substituent. Preferably, the cellulose derivative is sodium carboxymethylcellulose ("CMC") wherein the carboxymethylcellulose has a degree of substitution of about 0.70, and a viscosity of from about 25 cps to about 50 cps as measured on a Brookfield viscometer. Sodium carboxymethylcellulose with this degree of substitution is available from Aqualon Co. Wilmington, Del.

In a further aspect, the invention is directed to an improved method of alkaline paper making wherein a cellulose and inorganic material is formed into an alkaline slurry, dewatered, and shaped into paper. The method entails providing finely divided inorganic material, treating the inorganic material with a cellulose derivative modified by at least one ionic substituent, and mixing the treated inorganic material with cellulosic fiber to provide a slurry suitable for forming into paper.

Treating the inorganic material comprises adding a cellulose compound such as sodium carboxymethylcellulose ("CMC") such as dry CMC, or CMC in the form of an aqueous solution, preferably dry CMC to the inorganic material. The treating step entails mixing the inorganic material and CMC for 1 minute to 6 hours, preferably from about 15 minutes to 3 hours at 5° C. to 95° C., more preferably at 20° C. to 60° C.

Another aspect of the invention relates to an improved alkaline paper. The alkaline paper comprises cellulose fiber and the above finely divided particles of inorganic material treated with the above cellulose derivative.

DETAILED DESCRIPTION OF THE INVENTION

Figure 1:
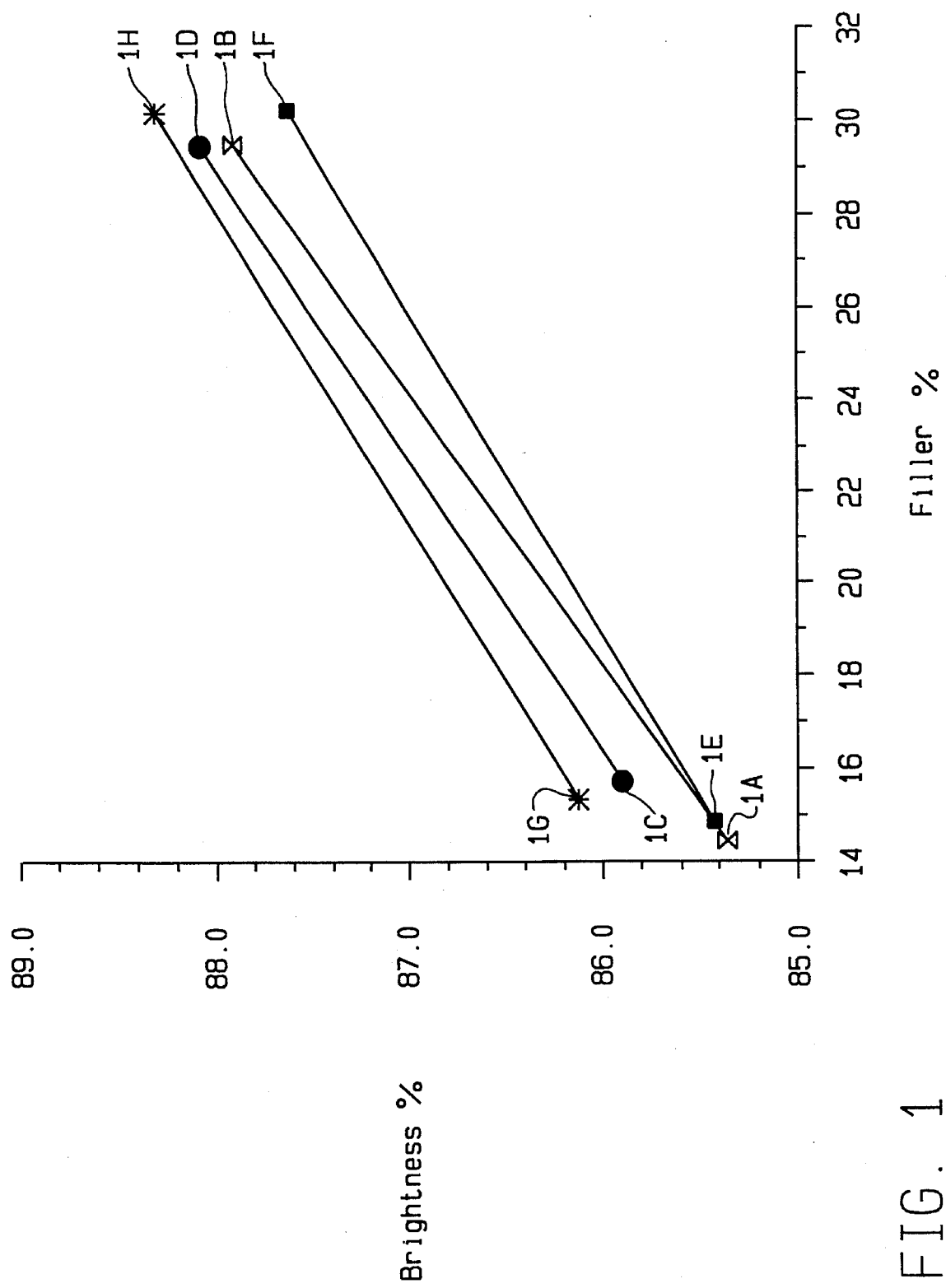
FIG. 1 shows TAPPI brightness of the papers of Examples 1A–1H.

Generally, the treated inorganic filler material of the invention is obtained by mixing finely divided inorganic material with a cellulose derivative that is modified by or contains at least one ionic substituent. The cellulose derivative preferably is a carboxymethyl ether cellulose that has a sodium substituent, i.e., CMC. The CMC has a viscosity on the order of 25 to 50 cps in a 2% aqueous solution, and can have a degree of substitution (average number of sodium carboxymethyl groups per anhydroglucose unit) of about 0.70. Other useful cellulose derivatives include oxidized or anionic starches.

The inorganic materials which may be employed as fillers in the invention may be any inorganic material typically used as a filler in paper making. These inorganic materials typically are calcium carbonate, clay, titanium dioxide, talc, alumina trihydrate, sodium aluminosilicate, zinc sulfide and the like. Calcium carbonate may be either natural, such as ground limestone and chalk, or precipitated calcium carbonate. Most preferred is precipitated calcium carbonate ("PCC").

The average particle size of inorganic materials useful in the invention is from about 0.1 to 5µ, preferably from about 0.2 to 3.0µ. Average particle size is defined as the equivalent spherical diameter as measured by a Sedigraph 5100, manufactured by Micrometrics Co.

Preparation of CMC treated inorganic filler materials useful in the invention can be performed by any of Method (A), Method (B), Method (C), or Method (D). In Method (A), dry powder of a cellulose derivative such as CMC is added to an aqueous slurry that has about 5% to about 75% by weight, preferably about 10%—about 30% by weight of inorganic material solids. The slurry and the CMC powder are mixed from about one minute to about six hours, preferably from about 15 minutes to about three hours. The temperature during the CMC addition typically is from about 5° C.–95° C., preferably about 20° C. to about 60° C., most preferably about 25° C.

In Method (B), an aqueous solution of a cellulose derivative such as CMC is added to an aqueous slurry of inorganic material that has about 5% to about 75% by weight, preferably about 10%—about 30% by weight. The inorganic material slurry and the CMC solution are mixed from about one minute to about six hours, preferably from about 15 minutes to about three hours. The temperature during addition of the CMC solution typically is 5° C.–95° C., preferably about 20° C. to about 60° C., most preferably about 25° C.

In Method (C), finely divided dry inorganic material is added to an aqueous solution of a cellulose derivative such as CMC. The inorganic material and solution of CMC are mixed from about one minute to about six hours, preferably from about 15 minutes to about three hours. The temperature during mixing is typically from about 5° C.–95° C., preferably about 20° C. to about 60° C., most preferably about 25° C.

In Method (D), the inorganic material is treated with CMC by adding dry powders of each of CMC and the finely divided inorganic material to water. In this method, the CMC, the inorganic material, and water are mixed from about one minute to about six hours, preferably from about 15 minutes to about three hours. The temperature during mixing may be 5° C.–95° C., preferably about 20° C. to about 60° C., most preferably about 25° C.

The amount of CMC added in each of the above methods is sufficient to provide inorganic material having about 0.01% to 5% by weight of CMC thereon, preferably about 0.05% to 0.5%. Useful aqueous solutions of CMC have about 0.1% to 5% by weight of CMC in the aqueous phase, preferably from about 0.5% to 1.5% by weight in the aqueous phase, most preferably about 1% by weight of the aqueous phase.

In the present invention, the brightness of alkaline paper surprisingly can be increased by adding finely divided inorganic material treated with the above cellulose derivative to cellulose fiber during alkaline paper making. Other uses of the treated filler material of the invention include use as pigments and fillers in cements, plastics, rubber, paints, and pharmaceuticals.

The alkaline paper of the invention comprises cellulosic fiber and a filler material of a finely inorganic material treated with the above disclosed cellulose derivatives. The treated inorganic filler material can be present in an amount of about 5 to 45% by weight of the paper.

The foregoing features, aspects and advantages of the present invention will become more apparent from the following non-limiting examples of the present invention.

Examples 1A–1H

Examples 1A–1F show the effects on brightness due to use of a PCC filler modified with varying doses of sodium carboxymethylcellulose. For comparison, Examples 1G and 1H show the effect on brightness due to use of untreated PCC filler.

In Examples 1A–1F, an aqueous slurry of 20% solids of PCC is treated with a 1% aqueous solution of sodium carboxymethylcellulose as in Method (B). The PCC has scalenohedral morphology, an average particle size of 1.4 microns, and a specific surface area of 12.3 m$^2$/g. The amount of sodium carboxymethylcellulose employed to treat the PCC in Examples 1A–1B is 0.1, 0.2 and 0.3%, based on the dry weight of PCC. The amount of sodium carboxymethylcellulose employed to treat the PCC in Examples 1C–1D is 0.2% based on the dry weight of PCC. The amount of sodium carboxymethylcellulose employed to treat the PCC in Examples 1E–1F is 0.3% based on the dry weight of PCC. In Examples 1G and 1H, untreated PCC is employed as the filler.

In Examples 1A–1H, a Formax Sheet Former (Noble and Wood type, manufactured by Adirondack Machine Corp.), is used to prepare handsheets of paper (60 g/m$^2$) from a furnish of 75% bleached hardwood and 25% bleached softwood Kraft pulps beaten to 400 Canadian Standard Freeness (CSF) at 7 pH in distilled water. Pulp consistency is 0.3125%. A retention aid (high density cationic polyacrylamide) is added to the pulp at a level of 0.05% (1 lb./ton of paper). Synthetic sizing agent (alkyl ketene dimer) is added to the pulp at a level of 0.25% (5 lbs/ton of paper). Filler is added to the pulp furnish to achieve a target filler loading level. The sheets are conditioned at 50% relative humidity and 23° C. for a minimum of 24 hours prior to testing.

The brightness of the resulting papers are tested using TAPPI test method T452-OM92. The results of this test are shown in Table 1 and FIG. 1 where reference numerals 1A–1H correspond to Examples 1A–1H, respectively. As shown in Table 1, the brightness of the paper is improved with use of PCC fillers exposed to increasing treatment levels of CMC.

TABLE 1

| Example No. | % Filler | Brightness |
| --- | --- | --- |
| 1A | 14.42[1] | 85.36 |
| 1B | 29.39[1] | 87.93 |
| 1C | 15.7[2] | 85.9 |
| 1D | 29.32[2] | 88.1 |
| 1E | 15.32[3] | 86.13 |

TABLE 1-continued

| Example No. | % Filler | Brightness |
|---|---|---|
| IF | 30.02[3] | 88.33 |
| 1G | 14.86[4] | 85.43 |
| 1H | 30.13[4] | 87.65 |

[1]PCC having treatment level of 0.1% CMC.
[2]PCC having treatment level of 0.2% CMC.
[3]PCC having treatment level of 0.3% CMC.
[4]Untreated PCC.

Examples 2A–2F

In Examples 2A–2F, the effect on brightness due to use of PCC treated with sodium carboxymethylcellulose is compared with the effect on brightness due to seperately adding untreated PCC to the pulp furnish which contains CMC. In Examples 2A–2F the PCC used has scalenohedral morphology, an average particle size of 1.3 microns, and a specific surface area of 12.1 $m^2/g$. In Examples 2A and 2B, an aqueous 20% solids slurry of PCC is treated with a 1% aqueous solution of sodium carboxymethylcellulose as in Method (B) to provide a treatment level of 0.5% CMC by weight of PCC. In Example 2C and 2D, the effect of separate additions of PCC slurry and sodium carboxymethylcellulose solution to the pulp furnish as in Method (D) is measured.

The amounts of PCC added is shown in Examples 2C and 2D in Table 2. The amount of sodium carboxymethylcellulose added in Examples 2C and 2D is sufficient to achieve a treatment level of sodium carboxymethylcellulose corresponding to the CMC treated PCC employed in Examples 2A and 2B. For comparison, untreated PCC, as illustrated in Examples 2E and 2F, is added to the pulp furnish which does not contain CMC.

Figure 2:
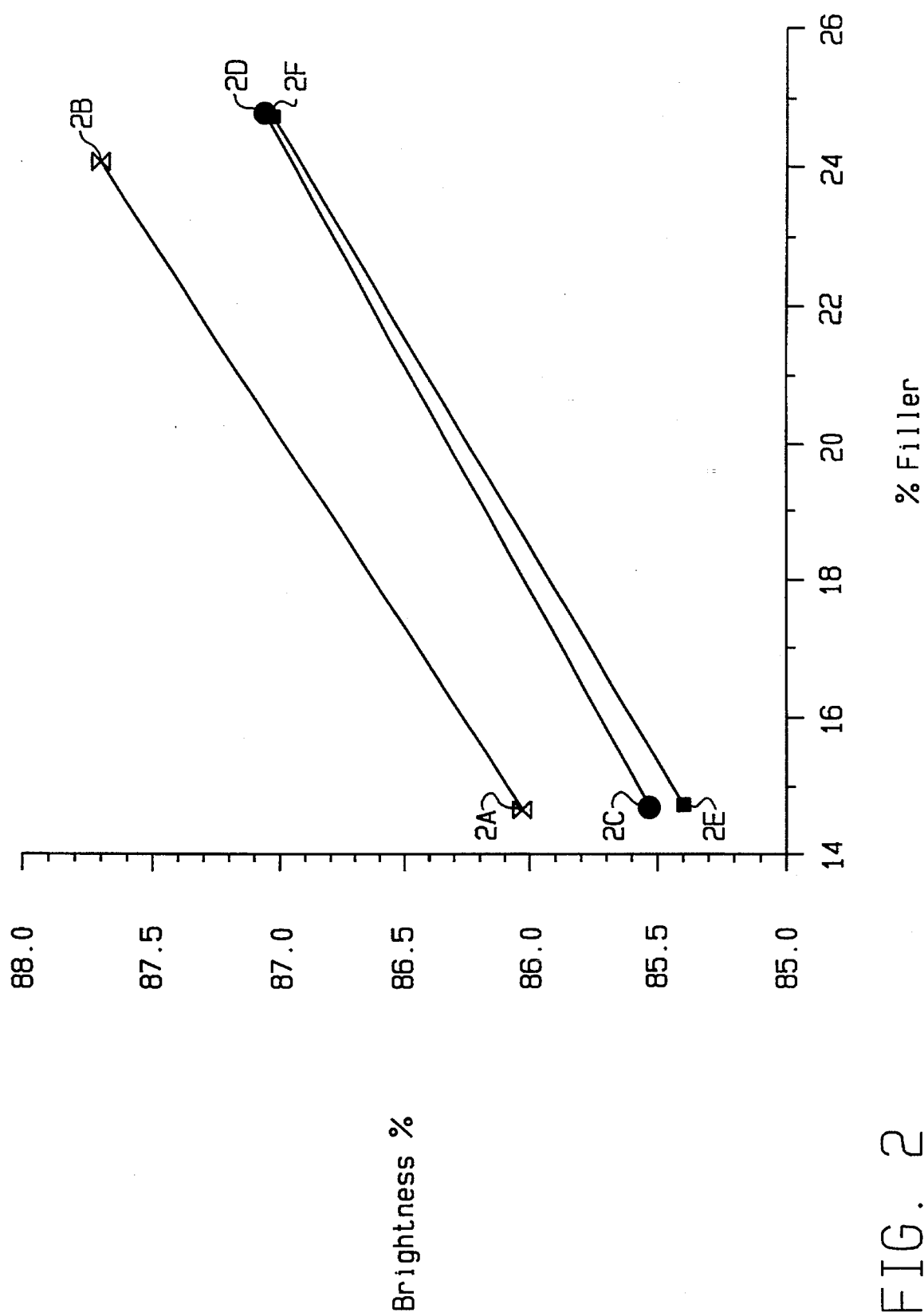
FIG. 2 shows TAPPI brightness of the papers of Examples 2A–2F.

The treated and untreated PCC fillers are employed in a pulp furnish to prepare handsheets as described in Example 1A. Brightness of the resulting handsheets is evaluated by TAPPI test method T452-OM 92. The results are shown in TABLE 2 and FIG.2 where reference numerals 2A–2F correspond to Examples 2A–2F, respectively.

TABLE 2

| Example No. | % Filler | Brightness |
|---|---|---|
| 2A | 14.63 | 86.03 |
| 2B | 24.02 | 87.7 |
| 2C | 14.68 | 85.53 |
| 2D | 24.75 | 87.06 |
| 2E | 14.72 | 85.40 |

TABLE 2-continued

| Example No. | % Filler | Brightness |
|---|---|---|
| 2F | 24.02 | 87.03 |

Examples 3A–3H

In Examples 3A–3H, the effect of the morphology of the PCC filler on brightness is evaluated. The PCCs employed either have prismatic or rhombohedral morphology.

PCC with a prismatic morphology has an average particle size of 2.2 microns and a specific surface area of 3.6 $m^2/g$. PCC with a rhombohedral morphology has an average particle size of 3.3 microns, and a specific surface area of 2.5 $m^2/g$.

In Examples 3A, 3B, 3E and 3F, aqueous slurries of 20% solids of each type of PCC is treated with a 1% aqueous solution of sodium carboxymethylcellulose as in Method (B) to provide a treatment level of 0.5% CMC by dry weight of the PCC filler. For comparison, in Examples 3C, 3D, 3G and 3H, aqueous slurries of 20% solids of untreated PCC are evaluated. The PCC fillers are added to the pulp furnish and formed into paper as in Example 1.

Figure 3:
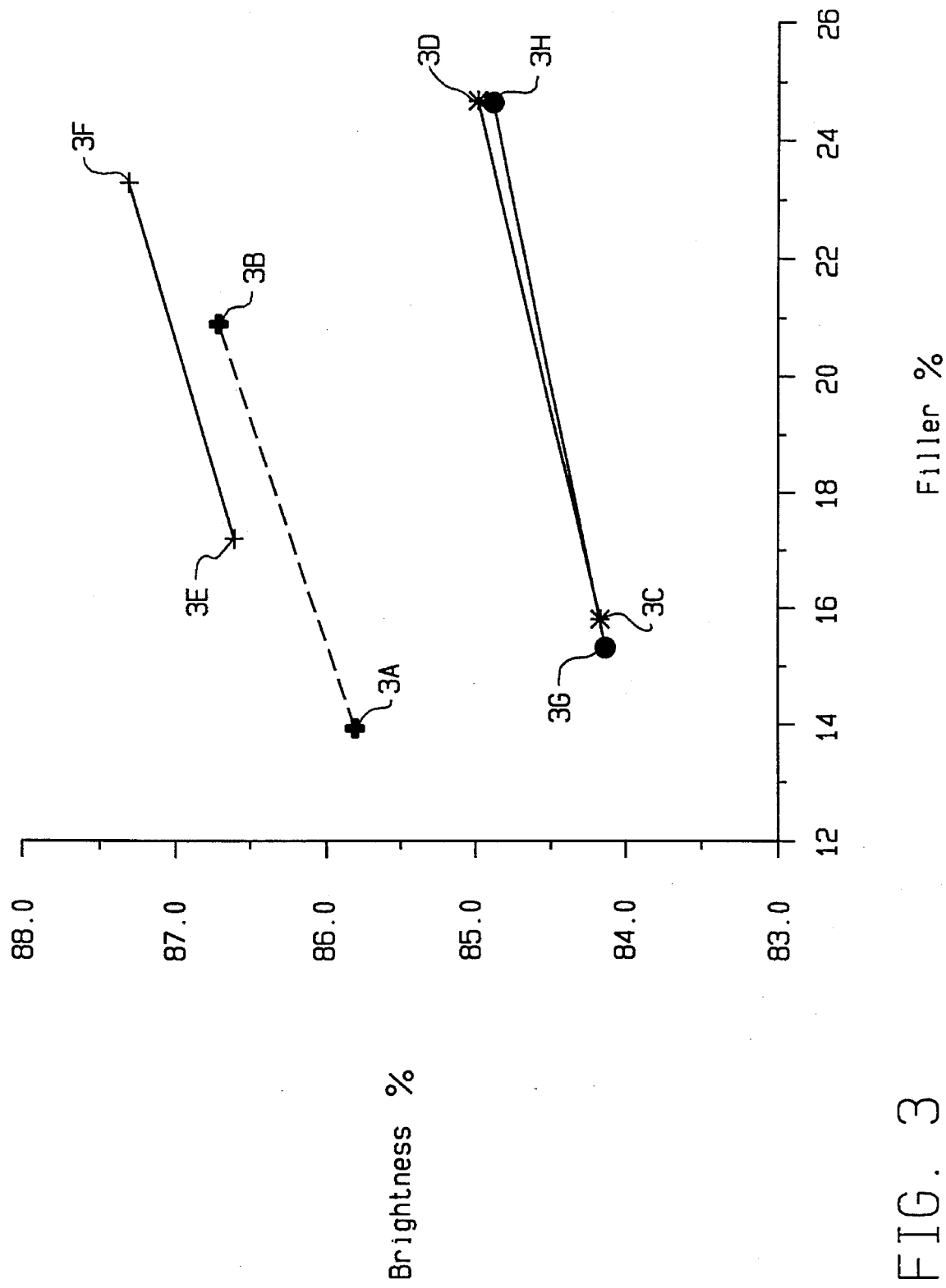
FIG. 3 shows TAPPI brightness of the papers of Examples 3A–3H.

The brightness levels of the paper sheets formed are shown in Table 3 and FIG. 3 where reference numerals 3A–3H correspond to Examples 3A–3H, respectively.

TABLE 3

| Example No. | % Treated Rhombohedral PCC in Pulp Furnish | % Untreated Rhombohedral PCC in Pulp Furnish | % Treated Prismatic PCC in Pulp Furnish | % Untreated Prismatic PCC in Pulp Furnish | Brightness |
|---|---|---|---|---|---|
| 3A | 13.93 | — | — | — | 85.8 |
| 3B | 20.9 | — | — | — | 86.7 |
| 3C | — | 15.80 | — | — | 84.16 |
| 3D | — | 24.69 | — | — | 84.96 |
| 3E | — | — | 17.20 | — | 86.6 |
| 3F | — | — | 23.29 | — | 87.3 |
| 3G | — | — | — | 15.31 | 84.13 |
| 3H | — | — | — | 24.65 | 84.86 |

The results in Table 3 show that various PCC morphologies can be treated by CMC to achieve paper of improved brightness.

Examples 4A–4D

Figure 4:
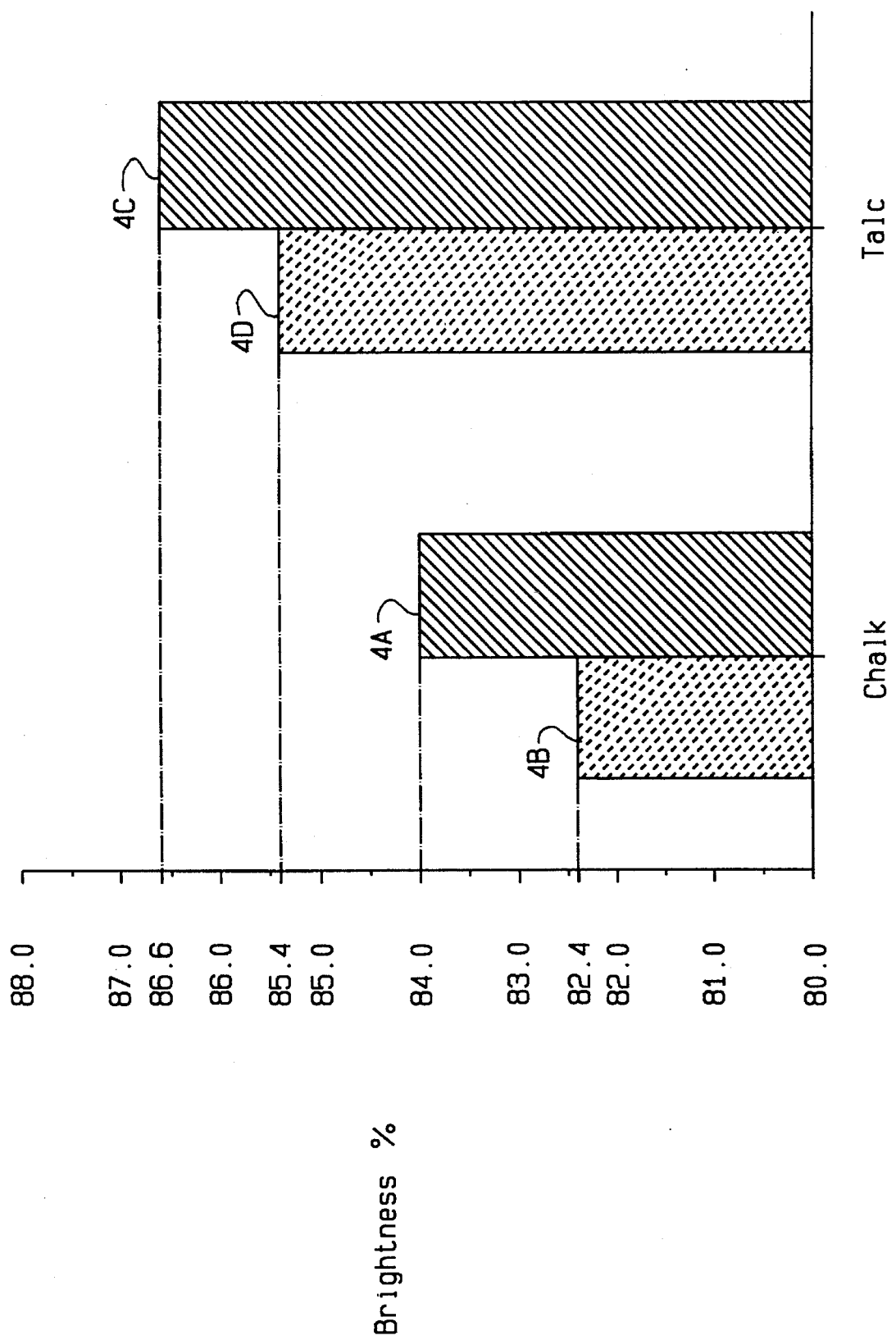
FIG. 4 shows TAPPI brightness of the papers of Examples 4A–4D.

An aqueous 20% solids slurry of chalk having an average particle size of 2.2 microns and a specific surface area of 2.1 $m^2/g$ is treated with a 1% aqueous solution of sodium carboxymethylcellulose as in Method (B) to provide a treatment level of 0.5% CMC by weight of chalk. An aqueous 20% solids slurry of talc having an average particle size of 4.0 microns and a specific surface area of 14.3 $m^2/g$ also was treated with a 1% aqueous solution of sodium carboxymethylcellulose as in Method (B) to provide a treatment level of 0.5% CMC by weight of talc. The treated chalk and talc fillers, as well as untreated chalk and talc fillers are employed to prepare handsheets as described in Example 1 except that the filler level in the pulp furnish is 30%. Brightness of the resulting papers is tested using TAPPI test method T452-OM92. The results are shown in Table 4 and FIG. 4 where reference numerals 4A–4D correspond to Examples 4A–4D, respectively.

TABLE 4

| Example No. | % Treated Chalk in Pulp Furnish | % Untreated Chalk in Pulp Furnish | % Treated Talc Pulp Furnish | % Untreated Talc in Pulp Furnish | Brightness |
|---|---|---|---|---|---|
| 4A | 30 | — | — | — | 84.0 |
| 4B | — | 30 | — | — | 82.4 |
| 4C | — | — | 30 | — | 86.6 |
| 4D | — | — | — | 30 | 85.4 |

The results show that various inorganic materials can be treated with sodium carboxymethylcellulose to provide fillers useful for providing improved paper brightness.

Although the present invention has been described in detail, it is clearly understood that the same is by way of example only and is not to be taken by way of limitation, the scope of the invention being limited only by the scope of the appended claims.

What is claimed is:

1. A composition for use as a paper making filler comprising an inorganic material containing a cellulose compound thereon.

2. The composition of claim 1 wherein said cellulose compound is a cellulose modified by or containing at least one ionic substituent.

3. The composition of claim 1 wherein the inorganic material is an alkaline earth carbonate.

4. The composition of claim 3 wherein the alkaline earth carbonate is calcium carbonate.

5. The composition of claim 1 wherein the cellulose compound is a salt of a cellulose.

6. The composition of claim 5 wherein the salt is sodium carboxymethylcellulose.

7. The composition of claim 1 wherein the cellulose compound is sodium carboxymethylcellulose that has a degree of substitution of about 0.7.

8. The composition of claim 7 wherein the sodium carboxymethylcellulose has a viscosity of from about 25 to about 50 cps.

9. The composition of claim 1, wherein the cellulose compound is present on the inorganic material in an amount of at least about 0.01% by weight.

10. The composition of claim 9, wherein the cellulose compound is present on the inorganic material in an amount of about 0.05% to about 0.5% by weight.

11. A composition for use as a paper making filler comprising an inorganic material containing a cellulose compound which is modified by or which contains at least one ionic substituent, and which is present on the inorganic material in an amount of at least about 0.01% by weight.

12. The composition of claim 11, wherein the inorganic material is an alkaline earth carbonate.

13. The composition of claim 12, wherein the alkaline earth carbonate is calcium carbonate.

14. The composition of claim 11, wherein the salt is sodium carboxymethylcellulose.

15. The composition of claim 14, wherein the cellulose compound is sodium carboxymethylcellulose that has a degree of substitution of about 0.7.

16. The composition of claim 15 wherein the sodium carboxymethylcellulose has a viscosity of from about 25 to about 50 cps.

17. The composition of claim 11, wherein the cellulose compound is present on the inorganic material in an amount of about 0.05% to about 0.5% by weight.

* * * * *